(12) United States Patent
Solum et al.

(10) Patent No.: US 10,827,288 B2
(45) Date of Patent: *Nov. 3, 2020

(54) EAR TO EAR COMMUNICATION USING WIRELESS LOW ENERGY TRANSPORT

(71) Applicant: Starkey Laboratories, Inc., Eden Prairie, MN (US)

(72) Inventors: Jeffrey Paul Solum, Greenwood, MN (US); Mark Seel, Fridley, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/152,675

(22) Filed: Oct. 5, 2018

(65) Prior Publication Data
US 2019/0208335 A1 Jul. 4, 2019

Related U.S. Application Data

(63) Continuation of application No. 14/960,859, filed on Dec. 7, 2015, now Pat. No. 10,097,931, which is a continuation of application No. 13/926,221, filed on Jun. 25, 2013, now Pat. No. 9,210,520.

(60) Provisional application No. 61/738,261, filed on Dec. 17, 2012.

(51) Int. Cl.
| | |
|---|---|
| *H04R 25/00* | (2006.01) |
| *H04W 4/80* | (2018.01) |
| *H04B 5/00* | (2006.01) |
| *H04W 76/10* | (2018.01) |
| *H04W 76/30* | (2018.01) |
| *H04W 84/18* | (2009.01) |
| *H04L 29/08* | (2006.01) |

(52) U.S. Cl.
CPC ......... *H04R 25/552* (2013.01); *H04B 5/0006* (2013.01); *H04R 25/505* (2013.01); *H04R 25/554* (2013.01); *H04W 4/80* (2018.02); *H04L 67/30* (2013.01); *H04R 2225/41* (2013.01); *H04R 2225/55* (2013.01); *H04W 76/10* (2018.02); *H04W 76/30* (2018.02); *H04W 84/18* (2013.01)

(58) Field of Classification Search
CPC ... H04R 25/00; H04R 25/558; H04R 2460/13
USPC .................. 381/312–315, 326, 328, 331
See application file for complete search history.

(56) References Cited

U.S. PATENT DOCUMENTS

| | | |
|---|---|---|
| 5,404,407 A | 4/1995 | Weiss |
| 6,175,635 B1 | 1/2001 | Meyer et al. |
| 8,036,405 B2 | 10/2011 | Ludvigsen et al. |

(Continued)

OTHER PUBLICATIONS

"U.S. Appl. No. 13/926,221, Non-Final Office Action dated Dec. 12, 2014", 7 pgs.

(Continued)

*Primary Examiner* — Suhan Ni
(74) *Attorney, Agent, or Firm* — Schwegman Lundberg & Woessner, P.A.

(57) ABSTRACT

Disclosed in some examples are systems, methods, and machine readable media which allows for hearing instruments to be in a piconet with each other while being connectable as a slave to another device such as a smart phone when it comes within range. In some examples to accomplish this, one or both of the connected hearing aids may send connectable advertisements while connected with each other in the piconet by time multiplexing the advertisements between connection events.

20 Claims, 6 Drawing Sheets

(56) References Cited

U.S. PATENT DOCUMENTS

| | | | |
|---|---|---|---|
| 8,189,835 B2 | 5/2012 | Dietz | |
| 8,249,262 B2 | 8/2012 | Chua et al. | |
| 8,422,705 B2 | 4/2013 | Kilsgaard | |
| 8,548,180 B2 | 10/2013 | Takagi et al. | |
| 9,210,520 B2 | 12/2015 | Solum et al. | |
| 10,097,931 B2 | 10/2018 | Solum et al. | |
| 2009/0076804 A1 | 3/2009 | Bradford et al. | |
| 2014/0169599 A1 | 6/2014 | Solum et al. | |
| 2016/0088408 A1 | 3/2016 | Solum et al. | |

OTHER PUBLICATIONS

"U.S. Appl. No. 13/926,221, Notice of Allowance dated Jul. 7, 2015", 7 pgs.

"U.S. Appl. No. 13/926,221, Response filed Jun. 12, 2015 to Non-Final Office Action dated Dec. 12, 2014", 10 pgs.

"U.S. Appl. No. 13/926,221, Response filed Sep. 9, 2014 to Restriction Requirement dated Jul. 9, 2014", 8 pgs.

"U.S. Appl. No. 13/926,221, Restriction Requirement dated Jul. 9, 2014", 5 pgs.

"U.S. Appl. No. 13/926,221, Supplemental Notice of Allowability dated Nov. 2, 2015", 3 pgs.

"U.S. Appl. No. 14/960,859, Final Office Action dated May 16, 2017", 6 pgs.

"U.S. Appl. No. 14/960,859, Non-Final Office Action dated Aug. 26, 2016", 7 pgs.

"U.S. Appl. No. 14/960,859, Non-Final Office Action dated Dec. 14, 2017", 5 pgs.

"U.S. Appl. No. 14/960,859, Notice of Allowance dated Jun. 8, 2018", 5 pgs.

"U.S. Appl. No. 14/960,859, Notice of Allowance dated Aug. 14, 2017", 5 pgs.

"U.S. Appl. No. 14/960,859, Preliminary Amendment filed Dec. 9, 2015", 6 pgs.

"U.S. Appl. No. 14/960,859, Response filed Jan. 26, 2017 to Non-Final Office Action dated Aug. 26, 2016", 13 pgs.

"U.S. Appl. No. 14/960,859, Response Filed Apr. 13, 2018 to Non-Final Office Action dated Dec. 14, 2017", 12 pgs.

"U.S. Appl. No. 14/960,859, Response filed Jul. 14, 2017 to Final Office Action dated May 16, 2017", 8 pgs.

"European Application Serial No. 13197757.1, Communication Pursuant to Article 94(3) EPC dated Jan. 24, 2018", 6 pgs.

"European Application Serial No. 13197757.1, Extended European Search Report dated Oct. 24, 2016", 9 pgs.

Bluetooth SIG, "Bluetooth Core Specification Version 4.0", [Online]. Retrieved from the Internet: <URL: https://www.bluetooth.org/docman/handlers/downloaddoc.ashx?doc_id=229737>, (Jul. 30, 2010), 2302 pgs.

EAR TO EAR COMMUNICATION USING WIRELESS LOW ENERGY TRANSPORT

CLAIM OF PRIORITY

This patent application is a continuation of U.S. patent application Ser. No. 14/960,859, filed Dec. 7, 2015, which is a continuation of U.S. patent application Ser. No. 13/926,221, filed Jun. 25, 2013, now issued as U.S. Pat. No. 9,210,520, which claims the benefit of priority, under 35 U.S.C. Section 119(e), to U.S. Provisional Patent Application Ser. No. 61/738,261, entitled "EAR TO EAR COMMUNICATION USING BLUETOOTH LOW ENERGY TRANSPORT," filed on Dec. 17, 2012, all of which are hereby incorporated by reference herein in their entirety.

BACKGROUND

Bluetooth® is a wireless technology standard promulgated by the Bluetooth Special Interest Group (SIG) which specifies a wireless protocol for exchanging data over short distances between compliant devices. Support for Bluetooth has become popular in devices such as cell phones, smart phones, tablet computers, personal computers, or the like.

BRIEF DESCRIPTION OF THE DRAWINGS

The drawings illustrate generally, by way of example, but not by way of limitation, various embodiments discussed in the present document.

DETAILED DESCRIPTION

Figure 1A:
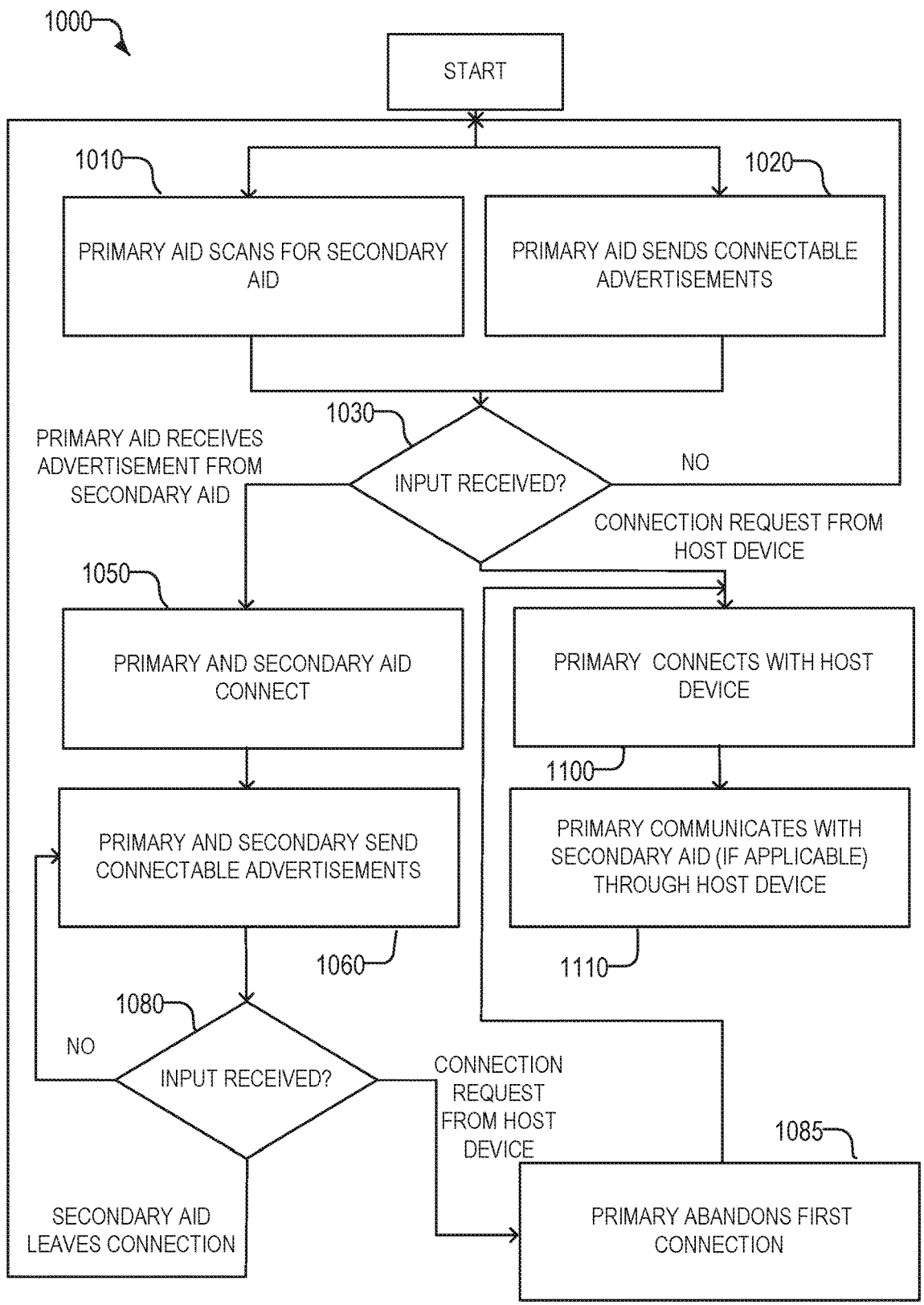
FIG. 1A shows a flowchart of a method of operating a primary aid according to some examples of the present disclosure.

In some examples, wireless technologies such as Bluetooth may be utilized to interconnect devices such as cell phones, smart phones, tablet computers, personal computers, or the like with hearing assistance devices such as hearing aids. These wireless technologies may also be used to interconnect two hearing aids to each other (e.g., the right and left aids). The use of these wireless technologies in hearing aids may allow hearing aid wearers to enjoy a rich set of use cases, including ear-to-ear connectivity, remote control of their hearing aids, streaming audio to their hearing aids, and the like. Since hearing aids have limited battery capabilities due to their small size, the standard Bluetooth protocol may sometimes be unsuitable due to its high power consumption.

In order to reduce overall power consumption, the Bluetooth Special Interest Group (SIG) has developed a modified Bluetooth protocol called the Bluetooth Low Energy (BLE) protocol released with Bluetooth Core Specification version 4.0 as of Jun. 30, 2010. This new protocol is simplified and features additional power saving features over conventional Bluetooth. This specification is incorporated by reference herein in its entirety.

The BLE protocol operates in the unlicensed 2.4 GHz Industrial, Scientific, and Medical band (ISM) and employs either a Frequency Division Multiple Access (FDMA) or Time Division Multiple Access (TDMA) scheme. Data is transmitted between BLE devices during sub-divisions of the BLE physical channel called events. To connect, one BLE device will transmit connectable advertising packets during a type of event called an advertising event. Other BLE devices may receive these advertising packets and may send a request for a connection to the source of the advertising packet. Once the connection is accepted, the BLE device that responded to the advertisement becomes the master device and the BLE device that sent the connectable advertisements will become a slave device.

A Bluetooth piconet is a term used to describe a network having a minimum of a master and at least one slave device. Thus once the two devices connect, they form a piconet. The BLE protocol defines "master" device as the device which defines the timings of transmissions and other communication parameters and a "slave" device which utilizes the communication parameters determined by the master device. Once the devices are in a piconet, the advertising event will end and connection events will begin. Connection events are data packet exchanges between BLE devices in a piconet.

Once a master device and a slave device are connected, the BLE standard does not allow the master device to be a slave device to another BLE device. This limitation presents difficulties in connecting hearing aids having ear-to-ear communication features with external devices using Bluetooth. For example, once the ear-to-ear connection between the first hearing instrument and the second instrument is setup, the Bluetooth Low Energy protocol only allows other devices to connect with the current communications session between the hearing aids as a slave device. This may be less than ideal as a smartphone or other device may prefer to be the master device. The BLE specification does not currently allow for the hearing aids to continue to scan for other connectable devices and connect as slave devices.

Disclosed in some examples are systems, methods, and machine readable media which allows for hearing instruments to be in a piconet with each other while being connectable as a slave to another device such as a smart phone when it comes within range. In some examples to accomplish this, one or both of the connected hearing aids may send connectable advertisements while connected with each other in the piconet by time multiplexing the advertisements between connection events.

In the description herein, the term "primary aid" and "secondary aid" are used to refer to a pair of hearing aids which may communicate with each other using BLE. The term "host device" is used to refer to any BLE compatible devices which are not primary aids or secondary aids, but which may connect using BLE to either the primary aid, the secondary aid, or both the primary and the secondary aid. Examples of host devices include mobile devices, smart phones, in-car infotainment systems, or the like. In some examples, the host device is not a hearing assistance device.

In a first example embodiment, prior to making a connection, if the hearing aid is configured as a single device (having no pair) it will behave as a connectable slave by sending connection advertisements searching for a host device. If the aid is configured as one of a pair of communicating devices, one of the aids may be designated as a primary aid. Prior to making a connection, the primary aid may alternate between the role of a BLE scanning master (attempting to connect with the secondary aid) and a BLE advertising connectable slave (attempting to connect with a host device). The other aid may be called the secondary aid and prior to making a connection may advertise as a connectable slave (attempting to connect as slave to either the primary aid or a host device). The determination of which aid is the primary and which aid is the secondary may be programmed into the aids during fitting, manufacturing, or through an automatic selection process whereby the aids automatically determine which aid is the primary. The addresses of the primary aid may be programmed into the secondary aid, and vice versa during fitting, manufacturing, or discovered automatically by the devices through a pairing process. In some examples, a master may be selected based upon one or more selection algorithms. For example, the hearing aid address (e.g., the Medium Access Control (MAC) address) may be utilized. The hearing aid with the lowest or highest MAC address may be determined to be the Master. In other examples, the hearing aid with the highest remaining battery level may be the Master (as the master role consumes the most power).

As already noted, prior to connecting, the primary aid of the pair may alternate between scanning for connectable advertisements sent by the secondary aid and sending connectable advertisements in between scan events. As a result, the primary aid may initially connect either as a slave with a host device (e.g., a smartphone) or as a master with the secondary aid, depending on whether the primary aid sees the connectable advertisement from the secondary device first or gets a connection request from the host first. The primary aid may remain alternating between the scan state as a BLE master and advertising state as a BLE slave with a scan window of sufficient duration to capture a slave's connectable advertisement until the primary aid is connected in a piconet with either the secondary aid or the host.

The secondary aid of the pair may advertise at a sufficient rate (the rate is the interval between consecutive advertising packets) to get the attention of the scanning primary aid or a scanning host device. A reasonable advertising rate in some examples may be 15 ms. This may be a good balance for current consumption for both the BLE slave device and the BLE master. The secondary aid may advertise at this interval and the primary aid may scan for these advertisements at a suitable rate (e.g., for 20 ms. with a scan interval of 1 second). Between scanning intervals the primary aid may send connectable advertisements at a suitable rate (e.g., a rate of 250 ms).

If the primary aid connects to the secondary aid before it connects to the host, it may maintain a suitable connection interval (e.g., a connection interval of 100 to 250 ms as requested by the primary or secondary device). Bluetooth LE devices exchange data in bursts at intervals called connection intervals. The interval determines the amount of time between the start of each data packet exchange sequence (e.g., between the connection events). Once connected, both the BLE master (the primary aid) and the BLE slave devices (the secondary aid) may send a connectable advertisement at a suitable rate (e.g., once every 100 to 250 ms.) between connection events to try and establish a connection with a host device that may be within range and wanting to establish a connection to the devices. If a host device requests a connection with either or both devices the aids may abandon their connection with each other and establish a connection with the host device requesting the connection. Once connected, the devices may maintain a connection with this host device at a suitable connection interval (e.g., at a connection interval of 100 to 200 ms.).

Once the two aids are in a connection with this host device, they will be able to continue their ear-to-ear communications with each other through the host device. For example, they may notify each other of any changes that need to be synchronized. In some examples, this will be possible via their connections to the host device by having the host device relay information from one device to the other or by having an area of Generic Attribute Profile (GATT) database characteristics and attributes that are shared between the two devices but maintained by the host. A hearing aid wishing to send a message to the other aid would write to a portion of the GATT database. The other hearing aid would then be notified of the change, or would periodically scan for changes, and then would read the message out of the GATT database.

If the primary aid (the one designated as master role when no other device is present) times out and leaves the connection to the host device (e.g., the smartphone) due to a loss of signal, it will resume switching between master and slave roles trying to establish either a connection as slave with the host device (at a suitable advertising rate—e.g., an advertising rate of 100 to 250 ms) or as master (with a suitable scanning window and interval, e.g., a scanning window of 20 ms. with a 1 sec scanning interval) with the other hearing instrument.

If the secondary aid (the one designated as slave role) loses a connection with the host device or master aid, it may enter the advertising state and send a connectable advertisement at a suitable rate (e.g., every 15 ms.) in an attempt to connect with either the primary aid or a host device (e.g., the smartphone). If either device remains in the connection with the host device, the device not in a connection simply reconnects with the host device or other hearing instrument.

Turning now to FIG. 1A an example method 1000 of operation of a primary aid according to some examples is shown. Operations 1010 and 1020, in which the primary aid may alternate between scanning for the secondary aid 1010 and sending connectable advertisements for a host device (e.g., a smart phone) 1020 may repeat until the primary aid receives an advertisement from the secondary aid or a connection request from a host device. In some examples, between scanning intervals, the primary aid may enter a sleep cycle to conserve battery power. If no input is received at operation 1030 the primary aid may continue to alternate scanning for the secondary aid 1010 and sending connectable advertisements 1020.

If a connection request is received at operation 1030 from a host device, control may proceed to operation 1100. At operation 1100, the primary may connect as a BLE slave with the host device and communicate with a secondary device (if one is also connected to the host device) through the host device at operation 1110. Alternatively, at operation 1030 if the primary aid receives an advertisement from the secondary aid, control may proceed to operation 1050. At operation 1050, the primary aid and secondary aid may connect. Once they are connected, the pair may then continue to send connectable advertisements periodically between connection events at operation 1060.

If the primary aid receives a connection request from a host device at 1080, then the primary aid may abandon the connection with the secondary aid at operation 1085 and connect with the host device at operation 1100. If the secondary aid is also connected to the host device (or subsequently connects), the devices may communicate with each other at operation 1110.

In some examples, to facilitate the communication between the primary aid and the secondary aid, the host device may relay information from one device to the other. For example an application running on the host device may receive messages from the primary aid and then retransmit them to the secondary aid and vice versa. In other examples, the devices may use the Generic Attribute Profile (GATT) maintained by the host and shared by the devices. GATT specifies a series of attributes stored by a GATT server (e.g., the host). The GATT database may include characteristics and attributes that are shared between the two devices.

If at operation 1080 the primary aid discovers that the secondary aid has left the connection with it (either through a loss of communication or because the secondary aid has connected to a host device), the primary aid may go back to alternatively scanning for the secondary aid 1010 and sending connectable advertisements 1020. If the secondary aid is in range and has established a connection with the host device, the primary aid is likely to do the same as a result of sending the connectable advertisements at operation 1020. This will enable the primary aid to once again communicate with the secondary aid at operation 1110.

Figure 1B:
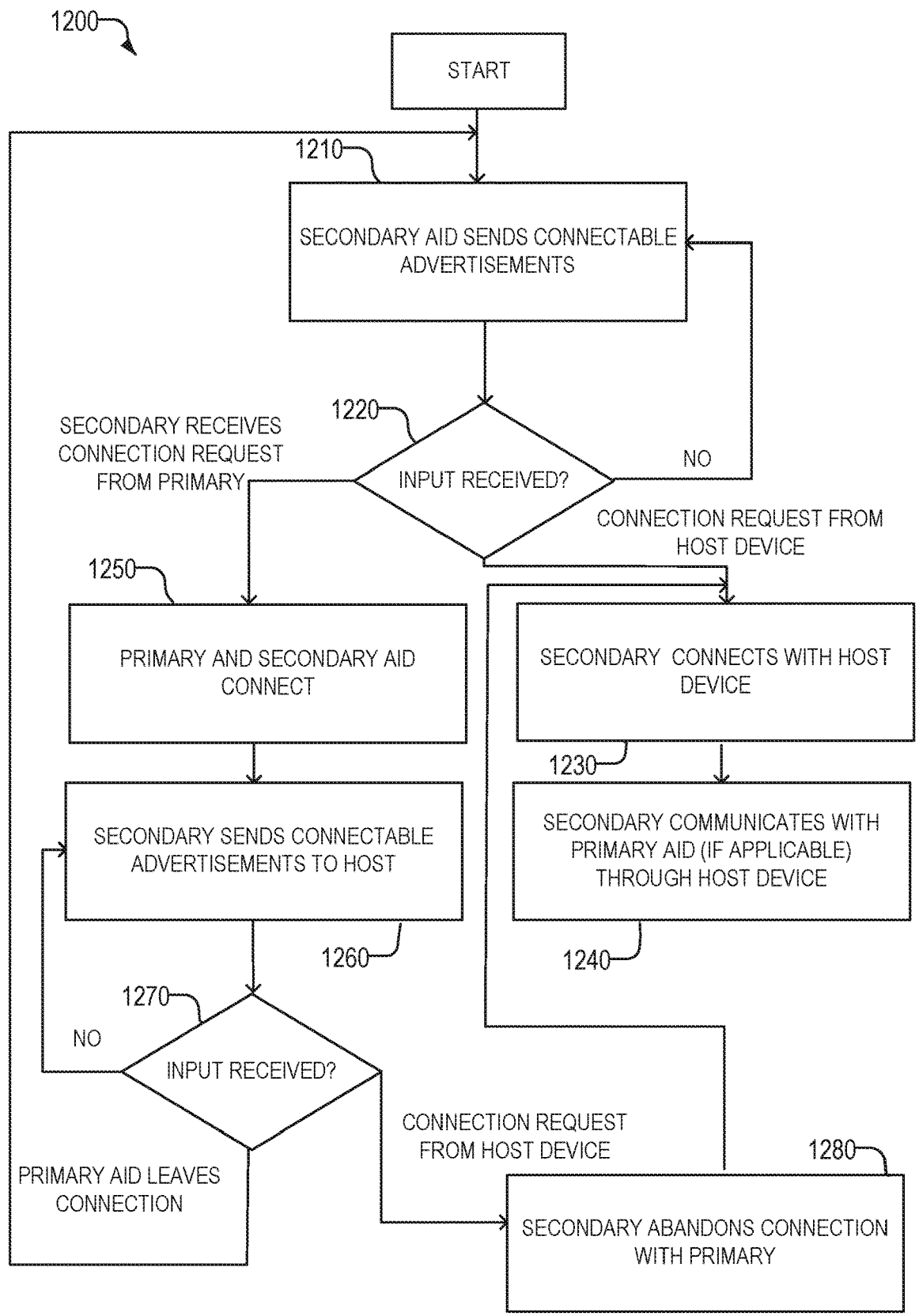
FIG. 1B shows a flowchart of a method of operating a secondary aid according to some examples of the present disclosure.

FIG. 1B shows a method 1200 of operating a secondary aid according to some examples. At operation 1210 the secondary aid may send connectable advertisements for connecting with either a primary aid or a host device. These connectable advertisements may be repeated until a response is received. If a response is received at operation 1220 and it is a connection request from a host device, control may proceed to operation 1230. At operation 1230, the secondary aid may connect with the host device. If a primary aid is also connected to the BLE device then the primary aid and secondary aid may communicate through the host device at operation 1240 as already explained.

If, at operation 1220, the secondary receives a connection request from the primary aid, then control will proceed to operation 1250. At operation 1250, the primary and secondary aids may connect. Once connected the primary and secondary aids may send connectable advertisements for connecting with a host device at operation 1260. If the secondary device receives a connection request from a host device at operation 1270, then the secondary may abandon the connection with the primary at operation 1280. At operation 1230 then, the secondary may connect with the host device and if the primary is also connected to the BLE device (or subsequently connects), at operation 1240, the primary and secondary aid may communicate with each other through the host device. If at operation 1270 the secondary aid discovers that the primary aid has left the connection, the secondary aid may return to sending connectable advertisements 1210. If the primary aid is in range and has established a connection with the host device, the secondary aid is likely to do the same as a result of sending the connectable advertisements at operation 1210. This will enable the primary aid to once again communicate with the secondary aid at operation 1240.

According to other examples, when a hearing aid is configured as a single device (having no pair) it will behave as a connectable slave. If the aid is part of a pair then the primary aid will assume the role of BLE master and before it is connected, it may scan for the other aid. Note that in these examples, contrary to the earlier examples, the BLE master does not send connectable advertisements searching for the host device. The BLE Master may remain in the scan state with a scan window of sufficient duration to capture a BLE slave's connectable advertisement.

In these examples, the secondary aid may advertise at a sufficient rate to get the attention of the scanning master aid. A reasonable advertising rate in this case may be 15 ms. This may be a good balance for current consumption for both the BLE slave device and the BLE master. The secondary aid may advertise at this interval and the primary aid may scan for a suitable duration and interval (e.g., 20 ms. with a scan interval of 1 second). Between scanning intervals the master aid may sleep.

Once the master (primary aid) connects to the slave (secondary aid), it may maintain a suitable connection interval (e.g., 100 to 250 ms.) as requested by either the primary or secondary device. The slave aid may maintain this connection and may also send one or more connectable advertisements between connection events in case a host device is within range and wants to establish a connection. In these examples, the primary aid may not send connectable advertisements between connection events. If a host device requests a connection, the secondary aid may notify the master aid that it is going into a connection with the other BLE device. The master aid may abandon its connection with the slave aid and may change roles to that of an advertising slave device and begin sending connectable advertisements at a suitable rate (e.g., one every 20 ms.). The host device may subsequently establish a connection with the other aid and now be able to maintain both hearing instruments in a connection with a suitable connection interval (e.g., 100 to 250 ms.). Once the two aids are in a connection with the host device, they will be able to notify each other of any changes that need to be synchronized with the other hearing instrument. This will be possible via their connections to the host device by having the host device relay information from one device to the other or by having an area of GATT data base characteristics and attributes that are shared between the two devices but maintained by the host.

If the primary aid (the one designated as master role when no other device is present) times out and leaves the connection to the host device, it may toggle between master and slave roles trying to establish a connection as slave with the host device (at a suitable advertising rate, e.g., 50 ms.) or as master (using a suitable scanning window, e.g., 50 ms.) with the other hearing instrument. The rate the primary aid toggles between advertising and scanning may be any suitable rate (e.g., once per second).

If the secondary aid (the one designated as slave role) loses a connection with the host device or with the master aid, it may enter the advertising state and send a connectable advertisement at a suitable rate (e.g., every 20 ms.).

The determination of which aid is the primary and which aid is the secondary may be programmed into the aids during fitting, manufacturing, or through an automatic selection process whereby the aids automatically determine which aid is the primary. The addresses of the primary aid may be programmed into the secondary aid, and vice versa during fitting, manufacturing, or discovered automatically by the devices through a pairing process. In some examples, a master may be selected based upon one or more selection algorithms. For example, the hearing aid address (e.g., the Medium Access Control (MAC) address) may be utilized. The hearing aid with the lowest or highest MAC address may be determined to be the Master. In other examples, the hearing aid with the highest remaining battery level may be the Master (as the master role consumes the most power).

Figure 2A:
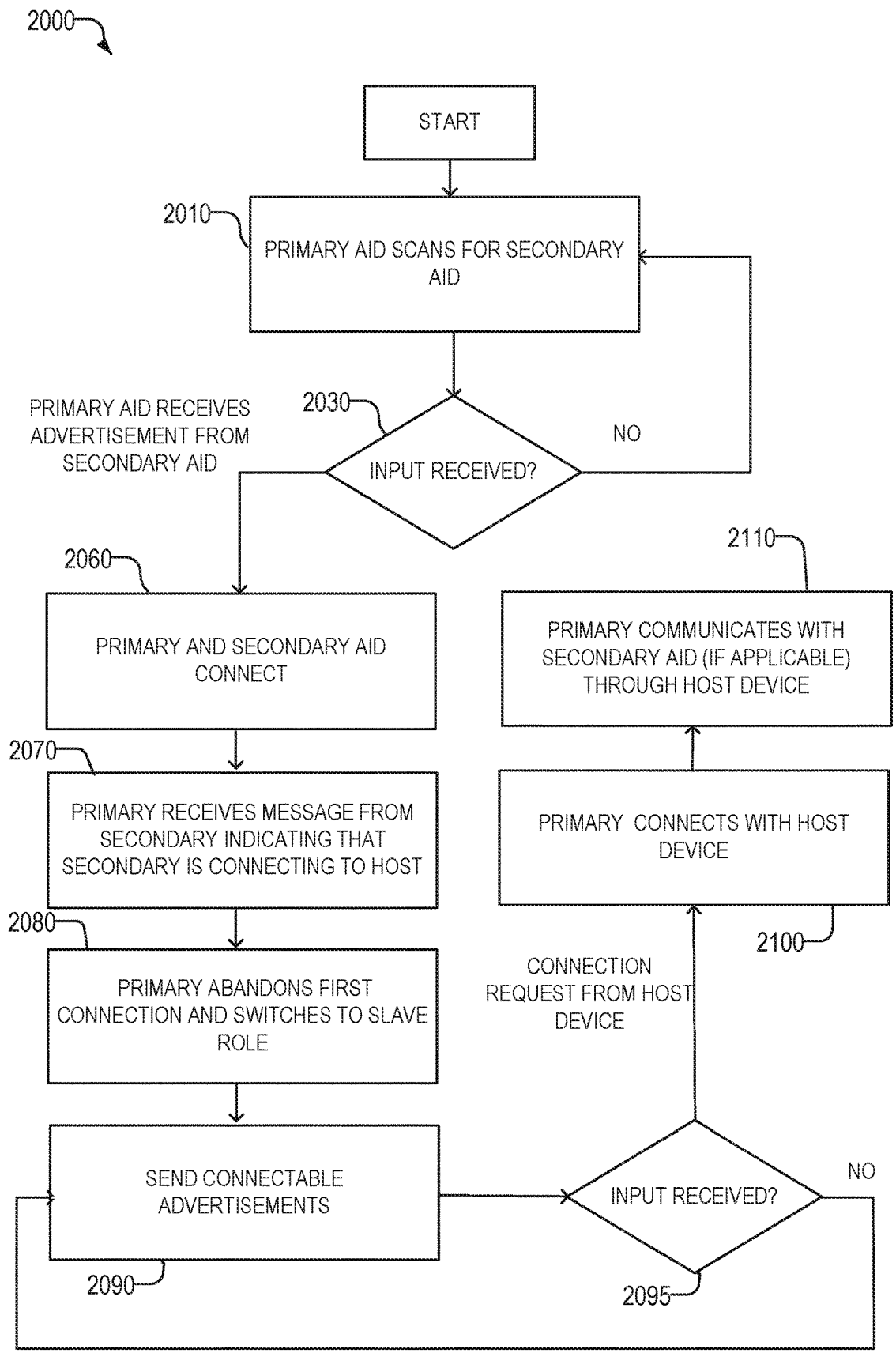
FIG. 2A shows a flowchart of a method of operating a primary aid according to some examples of the present disclosure.

Turning now to FIG. 2A an example method 2000 of operation of a primary aid according to these examples is shown. At operations 2010 the primary aid may scan for the secondary aid. In some examples, between scanning intervals, the primary aid may enter a sleep cycle to conserve battery power. In these examples, the primary aid may not send connectable advertisements. If no input is received at operation 2030 the primary aid may continue to scan for the secondary aid 2010. At operation 2030 if the primary aid receives an advertisement from the secondary aid, control may proceed to operation 2060. At operation 2060, the primary aid and secondary aid may connect. Once they are connected, the primary does not try and connect with a host device by sending connectable advertisements as in FIG. 1A, however the secondary device may try and connect with a host device. If the secondary device successfully connects with a host device, then it may inform the primary aid that it was able to find a host device. If the primary aid receives a notification at operation 2070 from a secondary aid that it is about to leave the connection with the primary aid for a host device the primary aid and the secondary aid abandon their connection at 2080 and the primary aid attempts to connect with the host device by switching roles to that of an advertising slave. The primary aid sends connectable advertisements at 2090 as an advertising slave. If at 2095 the primary aid receives no response, the primary aid continues to send connectable advertisements 2090. If at 2095 the primary aid receives a connection request from the host device, the primary aid may connect with the host device at 2100. If the secondary aid is also connected to the host device (or later becomes connected), the devices may communicate with each other at operation 2110. The aids may communicate with each other utilizing the methods previously described. Note that if no connection request is received from the host device at 2095, the primary aid may return to 2010 and resume scanning for the secondary aid after a predetermined period of time.

Figure 2B:
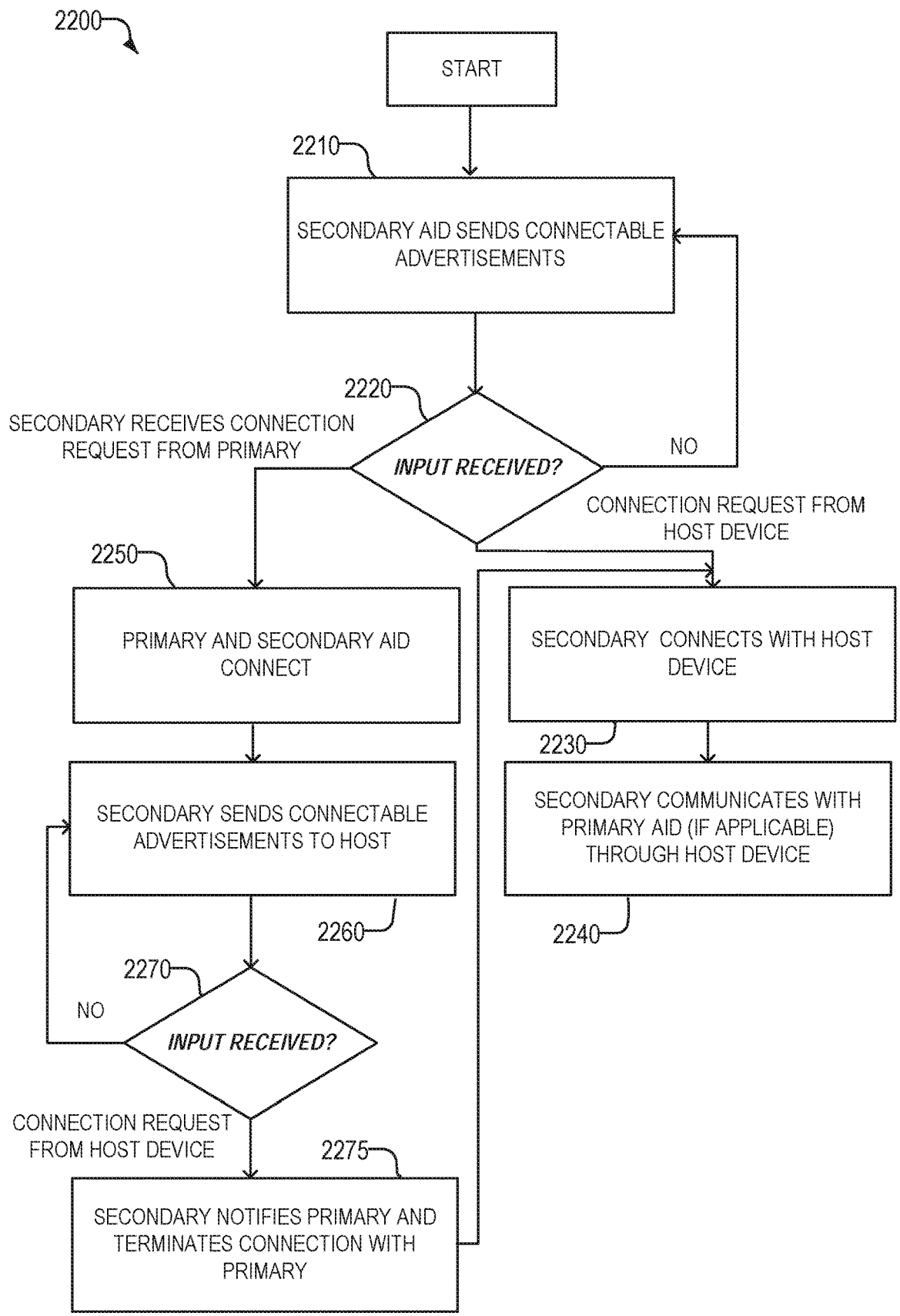
FIG. 2B shows a flowchart of a method of operating a secondary aid according to some examples of the present disclosure.

FIG. 2B shows a method 2200 of operating a secondary aid according to some examples. At operation 2210 the secondary aid may send connectable advertisements for connecting with either a primary aid or a host device. These connectable advertisements may be repeated until a response is received. If a response is received at operation 2220 and it is a connection request from a host device, control may proceed to operation 2230. At operation 2230, the secondary aid may connect with the host device. If a primary aid is also connected (or becomes connected to) to the host device then the primary aid and secondary aid may communicate through the host device at operation 2240. If, at operation 2220, the secondary receives a connection request from the primary aid, then control will proceed to operation 2250. At operation 2250, the primary and secondary aids may connect. Once connected the secondary aid may send connectable advertisements for connecting with a host device at operation 2260. If the secondary device receives a connection request from a host device at operation 2270, then the secondary may notify the primary aid and terminate the connection with the primary aid at operation 2275 and connect with the host device at operation 2230. If the primary also connects, or is already connected to the BLE device, at operation 2040, the primary and secondary aid may communicate with each other through the host device.

Figure 3A:
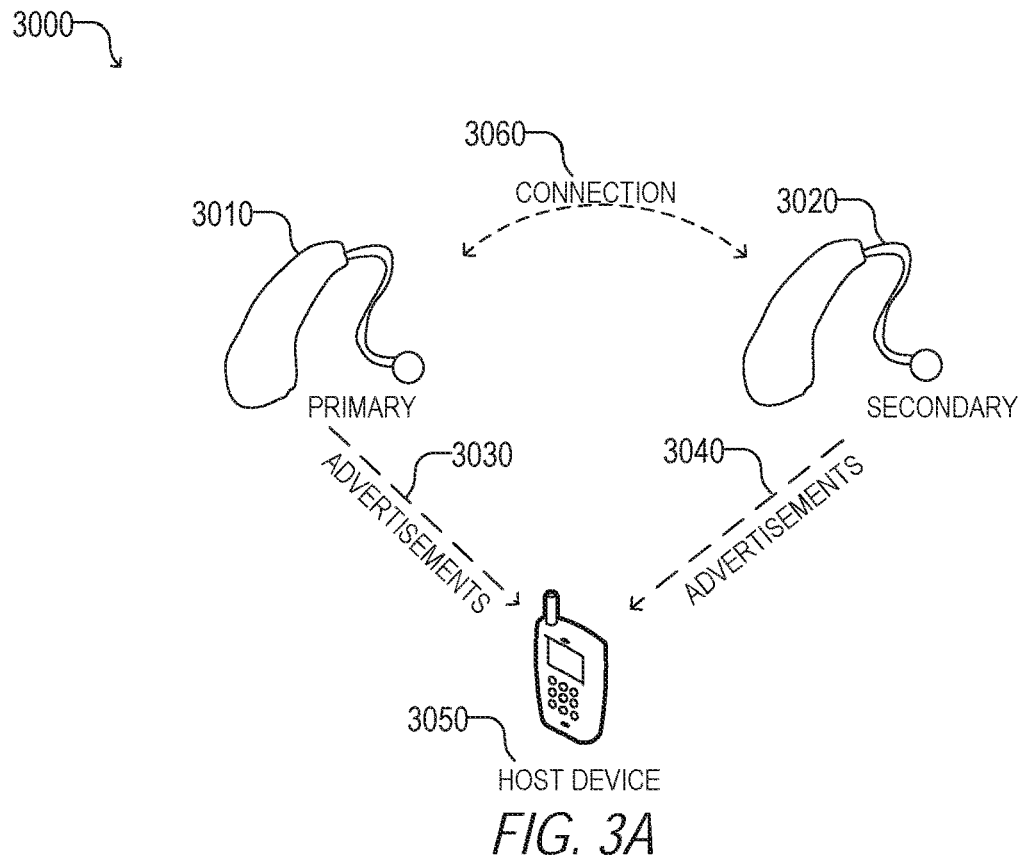
FIG. 3A shows a schematic of a hearing aid system according to some examples of the present disclosure.

FIG. 3A shows a schematic system 3000 illustrating some example embodiments. Primary aid 3010 and secondary aid 3020 are shown in ear-to-ear communication through Bluetooth connection 3060. Primary aid 3010 and secondary aid 3020 continue to send connectable advertisements 3030 and 3040 searching for host device 3050 in between connection events. In the event secondary aid 3120 or primary aid 3010 connects with host device 3050 the device which connects will leave the connection 3060. If the secondary aid 3020 leaves the connection to connect with the host device, then the primary aid 3010 will alternate between scanning for the secondary aid and sending connectable advertisements searching for the host device. If the primary aid 3010 leaves the connection to connect with the host device 3050, then the secondary aid 3020 will send connectable advertisements to connect with either the primary aid 3010 or the host device 3050.

Figure 3B:
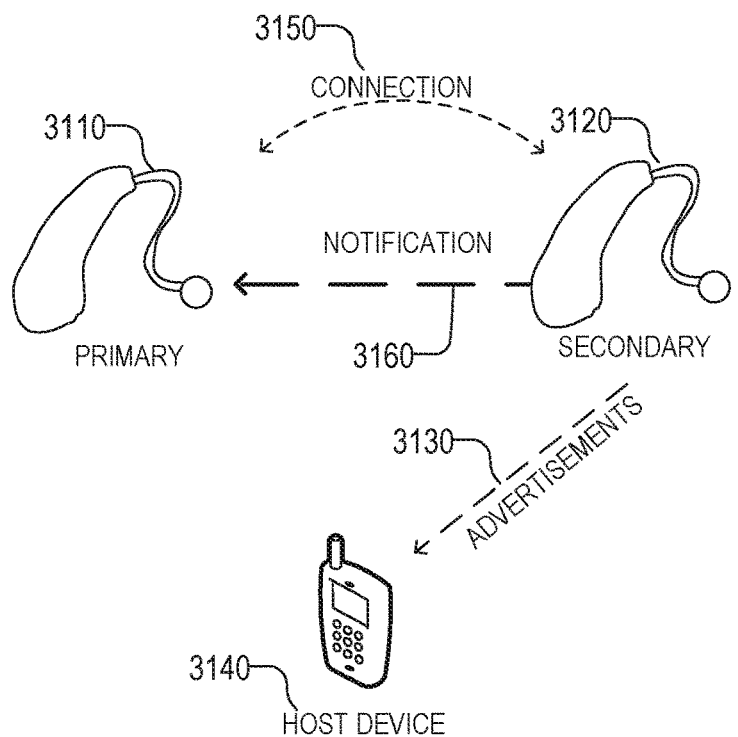
FIG. 3B shows a schematic of a hearing aid system according to some examples of the present disclosure.

FIG. 3B shows a schematic illustrating other example embodiments. Primary aid 3110 and secondary aid 3120 are shown in ear-to-ear communication through a Bluetooth connection 3150. While in connection 3150, the secondary aid 3120 continues to send connectable advertisements 3130 to host device 3140. In the event secondary aid 3120 and host device 3140 manage to connect, secondary aid will notify primary aid 3110 with message 3160 that it is leaving the connection 3150 for a connection with host device 3140. The primary aid 3110 may then attempt to connect with host device 3140 by sending connectable advertisements, or after a predetermined time, may begin scanning for the secondary aid (or alternate between sending connectable advertisements and scanning for the secondary aid).

The embodiments described herein allow for a host device such as a smart phone, PDA, tablet computer or other device to operate without deviating from the Bluetooth specification. The examples of FIG. 2 do not incorporate the Bluetooth master device sending connectable advertisements for the purposes of connecting as a slave. This is advantageous because certain Bluetooth wireless chip designers may restrict such behavior. In that case, examples in which only the secondary aid scans may provide the desired end result while working around these limitations.

Various embodiments of the present subject matter support wireless communications with a hearing assistance device. While the subject matter discussed above described Bluetooth implementations, one of ordinary skill in the art with the benefit of Applicants' disclosure will understand that the disclosure may be applied to other communication standards. Some examples of other wireless communications protocols may include, but are not limited to, IEEE 802.11 (wireless LANs), 802.15 (WPANs), 802.16 (Wi-MAX), cellular protocols including, but not limited to CDMA and GSM, ZigBee, and ultra-wideband (UWB) technologies. Although the present system is demonstrated as a radio system, it is possible that other forms of wireless communications can be used such as ultrasonic, infrared, optical, and others. It is understood that the standards which can be used include past and present standards. It is also contemplated that future versions of these standards and new future standards may be employed without departing from the scope of the present subject matter.

The wireless communications support a connection from other devices. Such connections include, but are not limited to, one or more mono or stereo connections or digital connections. It is understood that variations in communications protocols, antenna configurations, and combinations of components may be employed without departing from the scope of the present subject matter. Hearing assistance devices typically include an enclosure or housing, a microphone, hearing assistance device electronics including processing electronics, and a speaker or receiver. It is understood that in various embodiments the microphone is optional. It is understood that in various embodiments the receiver is optional. Antenna configurations may vary and may be included within an enclosure for the electronics or be external to an enclosure for the electronics. Thus, the examples set forth herein are intended to be demonstrative and not a limiting or exhaustive depiction of variations.

It is further understood that any hearing assistance device may be used without departing from the scope and the devices depicted in the figures are intended to demonstrate the subject matter, but not in a limited, exhaustive, or exclusive sense. It is also understood that the present subject matter can be used with a device designed for use in the right ear or the left ear or both ears of the wearer.

It is understood that the hearing aids referenced in this patent application include a processor. The processor may be a digital signal processor (DSP), microprocessor, microcontroller, other digital logic, or combinations thereof. The processing of signals referenced in this application can be performed using the processor. Processing may be done in the digital domain, the analog domain, or combinations thereof. Processing may be done using sub band processing techniques. Processing may be done with frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, and certain types of filtering and processing. In various embodiments the processor is adapted to perform instructions stored in memory which may or may not be explicitly shown. Various types of memory may be used, including volatile and nonvolatile forms of memory. In various embodiments, instructions are performed by the processor to perform a number of signal processing tasks. In such embodiments, analog components are in communication with the processor to perform signal tasks, such as microphone reception, or receiver sound embodiments (i.e., in applications where such transducers are used). In various embodiments, different realizations of the block diagrams, circuits, and processes set forth herein may occur without departing from the scope of the present subject matter.

The present subject matter is demonstrated for hearing assistance devices, including hearing aids, including but not limited to, behind-the-ear (BTE), in-the-ear (ITE), in-the-canal (ITC), receiver-in-canal (RIC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, including but not limited to receiver-in-canal (RIC) or receiver-in-the-ear (RITE) designs. The present subject matter can also be used in hearing assistance devices generally, such as cochlear implant type hearing devices and such as deep insertion devices having a transducer, such as a receiver or microphone, whether custom fitted, standard, open fitted or occlusive fitted. It is understood that other hearing assistance devices not expressly stated herein may be used in conjunction with the present subject matter.

Figure 4:
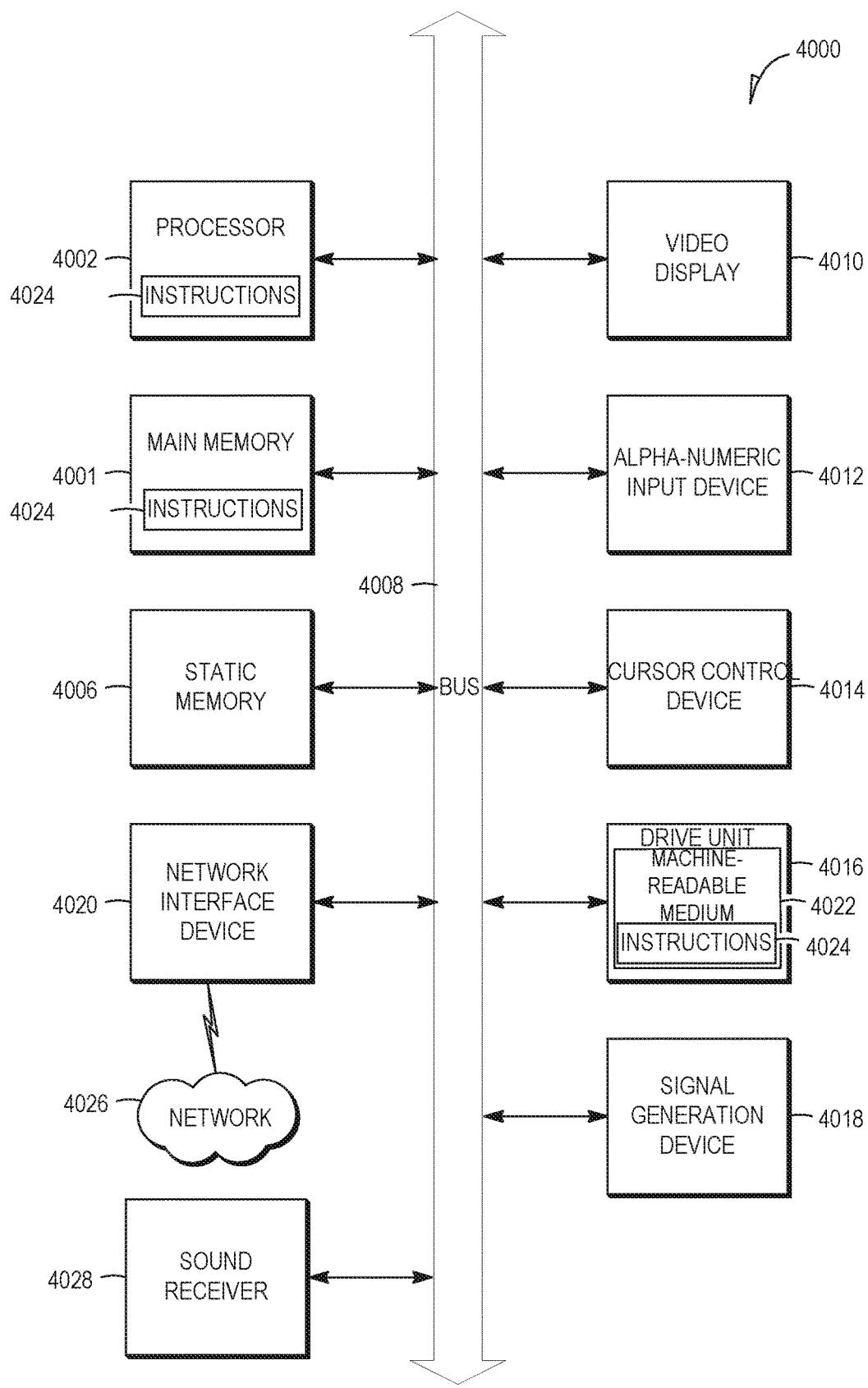
FIG. 4 shows a schematic of a machine according to some examples of the present disclosure.

FIG. 4 shows an example of a machine 4000 according to some examples of the present disclosure. Hearing aids described herein may be, or include portions of machine 4000. The other BLE devices described herein (e.g., the host device), or any other device may be or include portions of machine 4000.

FIG. 4 shows a diagrammatic representation of such a machine in the example form of a computer system 4000 within which a set of instructions for causing the machine to perform any one or more of the methods, processes, operations, or methodologies discussed herein may be executed. In alternative examples, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a Hearing Assistance device (such as a hearing aid), a Personal Computer (PC), a tablet PC, a Set-Top Box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Examples can also be practiced in distributed system environments where local and remote computer systems which that are linked (e.g., either by hardwired, wireless, or a combination of hardwired and wireless connections) through a network, both perform tasks. In a distributed system environment, program modules may be located in both local and remote memory-storage devices (see below).

The example computer system 4000 includes a processor 4002 (e.g., a Central Processing Unit (CPU), a Graphics Processing Unit (GPU) or both), a main memory 4001 and a static memory 4006, which communicate with each other via a bus 4008. The computer system 4000 may further include a video display unit 4010 (e.g., a Liquid Crystal Display (LCD) or a Cathode Ray Tube (CRT)). The computer system 4000 also includes an alphanumeric input device 4012 (e.g., a keyboard), a User Interface (UI) cursor controller 4014 (e.g., a mouse), a disk drive unit 4016, a signal generation device 4018 (e.g., a speaker), a sound receiver 4028 (e.g., a microphone), and a network interface device 4020 (e.g., a transmitter—such as a Bluetooth transmitter).

The disk drive unit 4016 includes a machine-readable medium 4022 on which is stored one or more sets of instructions 4024 and data structures (e.g., software) embodying or used by any one or more of the methodologies or functions illustrated herein. The software may also reside, completely or at least partially, within the main memory 4001 and/or within the processor 4002 during execution thereof by the computer system 4000, the main memory 4001 and the processor 4002 also constituting machine-readable media.

The instructions 4024 may further be transmitted or received over a network 4026 via the network interface device 4020 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, and optical and magnetic medium. In one example, machine-readable medium can include a non-transitory machine readable medium.

Method examples illustrated herein may be computer-implemented. Some examples may include computer-readable media encoded with a computer program (e.g., software), which includes instructions operable to cause an electronic device to perform methods of various examples. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, Random Access Memories (RAMs), Read Only Memories (ROMs), and the like.

OTHER NOTES AND EXAMPLES

Example 1 includes subject matter (such as a method, means for performing acts, machine readable medium including instructions which when performed by the machine cause the machine to perform operations) comprising at a first hearing assistance device: establishing a wireless connection with a second hearing assistance device; and sending a connectable advertisement between connection events of the wireless connection; receiving a request from a host device in response to the connectable advertisement; and responsive to the request, abandoning the wireless connection with the second hearing assistance device, and connecting with the host device.

In example 2, the subject matter of example 1 may optionally include communicating with the second hearing assistance device through the host device.

In example 3, the subject matter of any one or more of examples 1-2 may optionally include wherein communicating with the second hearing assistance device through the host device comprises using a Generic Attribute Profile.

In example 4, the subject matter of any one or more of examples 1-3 may optionally include at the first hearing assistance device, alternatively scanning for connectable advertisements sent from the second hearing assistance device and sending connectable advertisements; and responsive to receiving a connectible advertisement from the second hearing assistance device, establishing the wireless connection with the second hearing assistance device, wherein the first hearing assistance device is a master device.

In example 5, the subject matter of any one or more of examples 1-4 may optionally include wherein the wireless connection with the second hearing assistance device is a Bluetooth wireless connection.

In example 6, the subject matter of any one or more of examples 1-5 may optionally include wherein the host device is one of: a smartphone, a cellular phone, and a personal computer.

In example 7, the subject matter of any one or more of examples 1-6 may optionally include at the first hearing assistance device, sending connectable advertisements; and responsive to receiving a connection request from the second hearing assistance device, establishing the wireless connection with the second hearing assistance device, wherein the first hearing assistance device is a slave device.

Example 8 includes or may optionally be combined with the subject matter of any one of examples 1-7 to include subject matter (such as a device, apparatus, or machine) comprising a hearing assistance device comprising: a sound receiver configured to receive environmental audio; one or more processors configured to: establish a wireless connection with a second hearing assistance device; send a connectable advertisement between connection events of the wireless connection; receive a request from a host device in response to the connectable advertisement; responsive to the request, abandon the wireless connection with the second hearing assistance device, and connect with the host device; process the environmental audio according to one or more processing programs; and a signal generation device configured to output the processed environmental audio.

In example 9, the subject matter of any one or more of examples 1-8 may optionally include wherein the one or more processors are configured to communicate with the second hearing assistance device through the host device.

In example 10, the subject matter of any one or more of examples 1-9 may optionally include wherein communicating with the second hearing assistance device through the host device comprises using a Generic Attribute Profile.

In example 11, the subject matter of any one or more of examples 1-10 may optionally include wherein the one or more processors are configured to: alternatively scan for connectable advertisements sent from the second hearing assistance device and send connectable advertisements; and responsive to receiving a connectible advertisement from the second hearing assistance device, establish the wireless connection with the second hearing assistance device, wherein the first hearing assistance device is a master device.

In example 12, the subject matter of any one or more of examples 1-11 may optionally include wherein the wireless connection with the second hearing assistance device is a Bluetooth wireless connection.

In example 13, the subject matter of any one or more of examples 1-12 may optionally include wherein the host device is one of: a smartphone, a cellular phone, and a personal computer.

In example 14, the subject matter of any one or more of examples 1-13 may optionally include wherein the one or more processors are configured to: send connectable advertisements; and responsive to receiving a connection request from the second hearing assistance device, establish the wireless connection with the second hearing assistance device, wherein the first hearing assistance device is a slave device.

Example 15 includes subject matter (such as a method, means for performing acts, machine readable medium including instructions, which when performed by a machine cause the machine to perform the operations) comprising at a first hearing assistance device: establishing a wireless connection with a second hearing assistance device; and receiving a notification from the second hearing assistance device that it is leaving the connection to communicate with a host device; and responsive to the notification, abandoning the wireless connection with the second hearing assistance device, and connecting with the host device.

In example 16, the subject matter of examples 15 may optionally include communicating with the second hearing assistance device through the host device.

In example 17, the subject matter of any one or more of examples 15-16 may optionally include wherein communicating with the second hearing assistance device through the host device comprises using a Generic Attribute Profile.

In example 18, the subject matter of any one or more of examples 15-17 may optionally include at the first hearing assistance device, scanning for connectable advertisements sent from the second hearing assistance device; and responsive to receiving a connectible advertisement from the second hearing assistance device, establishing the wireless connection with the second hearing assistance device, wherein the hearing assistance device is a master device.

In example 19, the subject matter of any one or more of examples 15-18 may optionally include wherein the wireless connection with the second hearing assistance device is a Bluetooth wireless connection.

In example 20, the subject matter of any one or more of examples 15-19 may optionally include wherein the host device is one of: a smartphone, a cellular phone, and a personal computer.

Example 21 includes or may optionally be combined with the subject matter of any one of examples 15-20 to include subject matter (such as a device, apparatus, or machine) comprising a hearing assistance device comprising: a sound receiver configured to receive environmental audio; one or more processors configured to: establish a wireless connection with a second hearing assistance device; and receive a notification from the second hearing assistance device that it is leaving the connection to communicate with a host device; and responsive to the notification, abandon the wireless connection with the second hearing assistance device, and connect with the host device.

In example 22, the subject matter of any one or more of examples 15-21 may optionally include wherein the one or more processors are configured to communicate with the second hearing assistance device through the host device.

In example 23, the subject matter of any one or more of examples 15-22 may optionally include wherein the one or more processors are configured to communicate with the second hearing assistance device through the host device using at least a Generic Attribute Profile.

In example 24, the subject matter of any one or more of examples 15-23 may optionally include wherein the one or more processors are configured to: scan for connectable advertisements sent from the second hearing assistance device; and responsive to receiving a connectible advertisement from the second hearing assistance device, establish the wireless connection with the second hearing assistance device, wherein the hearing assistance device is a master device.

In example 25, the subject matter of any one or more of examples 15-24 may optionally include wherein the wireless connection with the second hearing assistance device is a Bluetooth wireless connection.

In example 26, the subject matter of any one or more of examples 15-25 may optionally include wherein the host device is one of: a smartphone, a cellular phone, and a personal computer.

Example 27 includes or may optionally be combined with the subject matter of any one of examples 15-26 to include subject matter (such as a method, means for performing acts, machine readable medium including instructions, which when performed by a machine cause the machine to perform the operations) comprising at a first hearing assistance device: establishing a wireless connection with a second hearing assistance device; sending connectable advertisements in between connection events of the wireless connection; receiving a connection request from a host device; and notifying the second hearing assistance device that the first wireless connection device is leaving the wireless connection to communicate with the host device; and abandoning the wireless connection with the second hearing assistance device, and connecting with the host device.

In example 27, the subject matter of examples 15-27 may optionally include communicating with the second hearing assistance device through the host device.

In example 28, the subject matter of any one or more of examples 15-27 may optionally include wherein communicating with the second hearing assistance device through the host device comprises using a Generic Attribute Profile.

In example 29, the subject matter of any one or more of examples 15-28 may optionally include at the first hearing assistance device, sending connectable advertisements; and responsive to receiving a connection request from the second hearing assistance device, establishing the wireless connection with the second hearing assistance device, wherein the hearing assistance device is a slave device.

In example 30, the subject matter of any one or more of examples 15-29 may optionally include wherein the wireless connection with the second hearing assistance device is a Bluetooth wireless connection.

In example 31, the subject matter of any one or more of examples 15-30 may optionally include wherein the host device is one of: a smartphone, a cellular phone, and a personal computer.

Example 32 includes or may optionally be combined with the subject matter of any one of examples 15-31 to include subject matter (such as a device, apparatus, or machine) comprising a hearing assistance device comprising: a sound receiver configured to receive environmental audio; one or more processors configured to: establish a wireless connection with a second hearing assistance device; send connectable advertisements in between connection events of the wireless connection; receive a connection request from a host device; and notify the second hearing assistance device that the first wireless connection device is leaving the wireless connection to communicate with the host device; and abandon the wireless connection with the second hearing assistance device, and connecting with the host device.

In example 33, the subject matter of any one or more of examples 15-32 may optionally include wherein the one or more processors are configured to communicate with the second hearing assistance device through the host device.

In example 34, the subject matter of any one or more of examples 15-33 may optionally include wherein the one or more processors are configured to communicate with the second hearing assistance device through the host device using at least a Generic Attribute Profile.

In example 35, the subject matter of any one or more of examples 15-34 may optionally include wherein the one or more processors are configured to: send connectable advertisements; and responsive to receiving a connection request from the second hearing assistance device, establish the wireless connection with the second hearing assistance device, wherein the hearing assistance device is a slave device.

In example 36, the subject matter of any one or more of examples 15-35 may optionally include wherein the wireless connection with the second hearing assistance device is a Bluetooth wireless connection.

In example 37, the subject matter of any one or more of examples 15-36 may optionally include wherein the host device is one of: a smartphone, a cellular phone, and a personal computer.

What is claimed is:

1. A method comprising:
at a first wireless computing device:
sending advertisements according to a wireless protocol to a second wireless computing device;
establishing a wireless connection with the second wireless computing device according to a first wireless protocol, the wireless connection established responsive to the advertisements;
sending a second advertisement according to the wireless protocol at a time after a first data exchange event between the first and second wireless computing devices and before a time when a second data exchange event between the first and second wireless computing devices takes place;
receiving a connection request from a third wireless computing device responsive to the second advertisement; and
in response to the connection request, ending the wireless connection with the second wireless computing device, and establishing a second wireless connection with the third wireless computing device according to the first wireless protocol.

2. The method of claim 1, comprising:
responsive to establishing the second wireless connection with the third wireless computing device, communicating with the second wireless computing device by passing information through the third wireless computing device.

3. The method of claim 2, wherein communicating with the second wireless computing device through the third wireless computing device comprises using a Generic Attribute Profile.

4. The method of claim 3, wherein communicating with the second wireless computing device through the third wireless computing device comprises notifying the second wireless computing device of a change in a parameter related to a hearing assistance device by modifying an attribute in a database of the Generic Attribute Profile.

5. The method of claim 1, wherein the first and second wireless computing devices are hearing assistance devices.

6. The method of claim 1, wherein the third wireless computing device is one of:
a smartphone, a cellular phone, and a personal computer.

7. The method of claim 1, comprising sending another advertisement at a time after the second data exchange event happens and before a time when a third data exchange event between the first and second wireless computing devices takes place.

8. The method of claim 1, wherein the first and second wireless computing devices comprise first and second hearing assistance devices respectively, wherein the second wireless computing device sends a hearing assistance setting to the first wireless computing device, and wherein the third wireless computing device streams audio to the first and second hearing assistance devices, the audio to be played through a speaker of the hearing assistance devices.

9. A first wireless computing device comprising:
a processor;
a memory, comprising instructions, which when executed by the processor, causes the processor to perform operations comprising:
sending advertisements according to a wireless protocol to a second wireless computing device;
establishing a wireless connection with the second wireless computing device according to a first wireless protocol, the wireless connection established responsive to the advertisements;
sending a second advertisement according to the wireless protocol at a time after a first data exchange event between the first and second wireless computing devices and before a time when a second data exchange event between the first and second wireless computing devices takes place;
receiving a connection request from a third wireless computing device responsive to the second advertisement; and
in response to the connection request, ending the wireless connection with the second wireless computing device, and establishing a second wireless connection with the third wireless computing device according to the first wireless protocol.

10. The first wireless computing device of claim 9, wherein the operations further comprise:
responsive to establishing the second wireless connection with the third wireless computing device, communicating with the second wireless computing device by passing information through the third wireless computing device.

11. The first wireless computing device of claim 10, wherein the operations of communicating with the second wireless computing device through the third wireless computing device comprises using a Generic Attribute Profile.

12. The first wireless computing device of claim 11, wherein the operations of communicating with the second wireless computing device through the third wireless computing device comprises notifying the second wireless computing device of a change in a parameter related to a hearing assistance device by modifying an attribute in a database of the Generic Attribute Profile.

13. The first wireless computing device of claim 9, wherein the first and second wireless computing devices are hearing assistance devices.

14. The first wireless computing device of claim 9, wherein the third wireless computing device is one of:
a smartphone, a cellular phone, and a personal computer.

15. The first wireless computing device of claim 9, wherein the operations further comprise sending another advertisement at a time after the second data exchange event happens and before a time when a third data exchange event between the first and second wireless computing devices takes place.

16. The first wireless computing device of claim 9, wherein the first and second wireless computing devices comprise first and second hearing assistance devices respectively, wherein the second wireless computing device sends a hearing assistance setting to the first wireless computing device, and wherein the third wireless computing device streams audio to the first and second hearing assistance devices, the audio to be played through a speaker of the hearing assistance devices.

17. A machine-readable medium, storing instructions, which when executed by a first wireless computing device, causes the first wireless computing device to perform operations comprising:
sending advertisements according to a wireless protocol to a second wireless computing device;
establishing a wireless connection with the second wireless computing device according to a first wireless protocol, the wireless connection established responsive to the advertisements;

sending a second advertisement according to the wireless protocol at a time after a first data exchange event between the first and second wireless computing devices and before a time when a second data exchange event between the first and second wireless computing devices takes place;

receiving a connection request from a third wireless computing device responsive to the second advertisement; and in response to the connection request, ending the wireless connection with the second wireless computing device, and establishing a second wireless connection with the third wireless computing device according to the first wireless protocol.

18. The machine-readable medium of claim 17, wherein the operations further comprise:

responsive to establishing the second wireless connection with the third wireless computing device, communicating with the second wireless computing device by passing information through the third wireless computing device.

19. The machine-readable medium of claim 18, wherein the operations of communicating with the second wireless computing device through the third wireless computing device comprises using a Generic Attribute Profile.

20. The machine-readable medium of claim 19, wherein the operations of communicating with the second wireless computing device through the third wireless computing device comprises notifying the second wireless computing device of a change in a parameter related to a hearing assistance device by modifying an attribute in a database of the Generic Attribute Profile.

\* \* \* \* \*